United States Patent
Marchandise et al.

(10) Patent No.: US 9,494,142 B2
(45) Date of Patent: Nov. 15, 2016

(54) STEERABLE HALL EFFECT THRUSTER HAVING PLURAL INDEPENDENTLY CONTROLLABLE PROPELLANT INJECTORS AND A FRUSTOCONICAL EXHAUST OUTLET

(71) Applicant: SNECMA, Paris (FR)

(72) Inventors: Frederic Raphael Jean Marchandise, Vernon (FR); Anthony Claude Bernard Lorand, Notre Dame de l'Isle (FR); Vanessa Marjorie Vial, Vernon (FR)

(73) Assignee: SNECMA, Paris (FR)

( * ) Notice: Subject to any disclaimer, the term of this patent is extended or adjusted under 35 U.S.C. 154(b) by 150 days.

(21) Appl. No.: 14/360,099

(22) PCT Filed: Nov. 19, 2012

(86) PCT No.: PCT/FR2012/052659
§ 371 (c)(1),
(2) Date: May 22, 2014

(87) PCT Pub. No.: WO2013/076409
PCT Pub. Date: May 30, 2013

(65) Prior Publication Data
US 2014/0290210 A1  Oct. 2, 2014

(30) Foreign Application Priority Data
Nov. 22, 2011 (FR) ..................................... 11 60635

(51) Int. Cl.
*F03H 1/00* (2006.01)
*B64G 1/40* (2006.01)

(52) U.S. Cl.
CPC ............. *F03H 1/0006* (2013.01); *B64G 1/405* (2013.01); *F03H 1/0062* (2013.01); *F03H 1/0068* (2013.01); *F03H 1/0075* (2013.01)

(58) Field of Classification Search
CPC .. F03H 1/0006; F03H 1/0062; F03H 1/0075; F03H 1/0068; B64G 1/405
See application file for complete search history.

(56) References Cited

U.S. PATENT DOCUMENTS

| | | | | |
|---|---|---|---|---|
| 6,158,209 | A * | 12/2000 | Latischev | F03H 1/0075 313/361.1 |
| 6,481,672 | B1 * | 11/2002 | Goodzeit | B64G 1/26 244/169 |
| 6,919,672 | B2 | 7/2005 | Madocks | |
| 2002/0145389 | A1 | 10/2002 | Bugrova et al. | |

FOREIGN PATENT DOCUMENTS

EP   1 021 073   7/2000

OTHER PUBLICATIONS

Spores "The USAF Electric Propulsion Program", Jul. 1998, 34th AIAA/ASME/SAE/ASEE Joint Propulsion Conference & Exhibit, p. 8.*
Garrigues, L. et al., "Performance Modeling of a Thrust Vectoring Device for Hall Effect Thrusters" Journal of Propulsion and Power, vol. 25, No. 5, pp. 1003-1012, Sep.-Oct. 2009 XP 055032833.
International Search Report Issued Apr. 8, 2013 in PCT/FR12/052659 Filed Nov. 11, 2012.

* cited by examiner

*Primary Examiner* — Phutthiwat Wongwian
*Assistant Examiner* — William Breazeal
(74) *Attorney, Agent, or Firm* — Oblon, McClelland, Maier & Neustadt, L.L.P.

(57) ABSTRACT

A steerable-thrust Hall effect thruster in which a final stage of a magnetic circuit includes an inner pole and a facing outer pole, the inner pole being offset axially downstream relative to the outer pole, so that a magnetic field is inclined relative to a transverse plane of the thruster.

12 Claims, 4 Drawing Sheets

STEERABLE HALL EFFECT THRUSTER HAVING PLURAL INDEPENDENTLY CONTROLLABLE PROPELLANT INJECTORS AND A FRUSTOCONICAL EXHAUST OUTLET

BACKGROUND OF THE INVENTION

1. Field of the Invention

The present invention relates to the field of Hall effect thrusters.

2. Description of Related Art

The invention relates more particularly to a steerable-thrust Hall effect thruster having an annular channel, an anode, an injection circuit, a magnetic circuit, and a cathode. The annular channel is defined by two concentric walls with a central axis, having an open end and a closed end, and it includes an upstream segment beside the closed end that is subdivided by radial walls into a plurality of separate compartments. The anode is situated at the closed end of the annular channel. The injection circuit is suitable for injecting a propulsion gas, e.g. such as xenon, into the compartments of the annular channel, and it includes at least one individual flow rate regulator device for each compartment. The magnetic circuit is suitable for generating a magnetic field at the open end of the annular channel. The cathode is situated on the outside at the open end of the annular channel.

The terms "upstream" and "downstream" in the present context are defined relative to the normal flow direction of the propulsion gas along the axis defined by the central axis of the annular channel.

Typically, when such a Hall effect thruster is in operation, electrons emitted by the cathode and attracted towards the anode at the bottom of the annular channel are trapped by the magnetic field in spiral trajectories between the two walls, thus forming a virtual cathode grid. Electrons escaping from this magnetic enclosure towards the anode come into collision with atoms of propulsion gas injected into the annular channel by the injection circuit, thereby creating an ionized plasma.

The positive ions of the plasma are accelerated by the electric fields that exist between the anode and the virtual cathode grid formed by the cloud of electrons trapped by the magnetic field at the open end of the annular channel. Since the mass of such a positive ion is much greater than the mass of an electron, the trajectory of the ions is hardly affected by the magnetic field. The ions in this plasma jet are finally neutralized downstream from the magnetic field by electrons emitted from the cathode or that have been produced by the ionization of the plasma.

Hall effect thrusters have begun to be used in attitude and orbit control systems (AOCSs) for space vehicles, and in particular in AOCSs for geostationary satellites. In that function, Hall effect thrusters have the advantage of enabling the attitude and/or the position of the vehicle to be controlled accurately while requiring significantly smaller mass and less complexity than conventional systems using inertial devices, such as for example reaction wheels, in combination with chemical thrusters for desaturation purposes.

Typically, the thrust force from a Hall effect thruster is not steerable, which can make it necessary to use a plurality of Hall effect thrusters simultaneously in order to obtain a thrust force in a desired direction in order to change the pointing direction and/or the position of the space vehicle. This implies in particular an electrical power supply circuit for the thrusters that is quite complex. Alternatively, a Hall effect thruster mounted on a pivot mount for steering the thrust force of the thruster is described, for example in the article "Inmarsat 4F1 plasma propulsion system initial flight operations" (IECP-2005-082) described by H. Grey, S. Provost, M. Glogowski, and A. Demaire in the $29^{th}$ International Electric Propulsion Conference in 2005, Princeton, USA. Nevertheless, such a pivot mount presents a considerable amount of mechanical complexity, and it requires moving parts that always run the risk of jamming in the very severe environment of a space vehicle.

To mitigate those drawbacks, U.S. Pat. No. 5,845,880 proposes a Hall effect thruster in which thrust can be steered by a last magnetic stage that is subdivided into individually activatable sectors. The orientation of the thrust can thus be varied by varying the magnetic field, which presents drawbacks for maintaining the magnetic enclosure around the entire perimeter of the open end of the annular cathode, and thus for maintaining the virtual cathode grid. Furthermore, the electrical power supply to the final magnetic stage of variable power also adds a certain degree of complexity to the thruster.

The article "Performance and lifetime assessment of a thrust steering device for the PPS® 1350 Hall effect plasma thruster" by O. Duchemin, M. Saverdi, and D. Estublier, published in the 2008 Space Propulsion Conference, May 5-8, 2008 at Heraklion, Greece, and in the article "Performance modeling of a thrust vectoring device for Hall effect thrusters" published in the "Journal of Propulsion and Power", Vol. 25, No. 5, September-October 2009, tests are described on a steerable-thrust Hall effect thruster similar to that of U.S. Pat. No. 5,845,880, but including, in addition to a final magnetic stage subdivided into individually activatable sectors, a plurality of propulsion gas injection nozzles distributed in the annular channel, with individual flow rate regulation in order to obtain varying and non-uniform distribution of the gas that is injected into the annular channel. Nevertheless, in those articles, the steering of the thrust by the non-uniform flow rates of gas injected into the annular channel is described as being relatively ineffective, and it is even discouraged in view of the additional complexity of the flow rate regulator devices.

European patent application EP 1 021 073 A1 likewise describes a steerable-thrust Hall effect thruster having a plurality of propulsion gas injection nozzles distributed in the annular channel with individual flow rate regulation. In addition, in that thruster, compartments are formed in the annular channel by radial walls. Nevertheless, in that document, the non-uniform distribution of gas flow rates in the annular channel is proposed for the purpose of moving the thrust axis laterally without changing its orientation. The magnetic circuit has a final stage with an inner pole that is offset axially upstream relative to the outer pole so as to concentrate the ionized jet of propulsion gas. As in U.S. Pat. No. 5,845,880, the thrust is steered by a non-uniform magnetic field, the final magnetic stage also being subdivided into individually activatable sectors.

BRIEF SUMMARY OF THE INVENTION

The invention seeks to propose a Hall effect thruster in which thrust is steerable in a manner that is more effective, without it being necessary to have recourse to controlling the magnetic field or to mechanically pivoting the thruster.

In at least one embodiment, this object is achieved by the fact that in a final stage of the magnetic circuit comprising an inner pole and a facing outer pole, the inner pole is offset axially downstream relative to the outer pole, so that the magnetic field is inclined relative to a transverse plane of the thruster.

By means of these arrangements, the virtual cathode grid formed by the electrons captured in the magnetic field is also inclined, and this in such a manner as to propel the jets of propulsion gas corresponding to each of the compartments of the annular channel in diverging directions. Unlike converging jets, these diverging jets do not present the drawback of interfering with one another, thereby enabling each compartment to be associated with a propulsion direction that is substantially different from the directions of the others, and thus enabling the direction of the overall thrust from the thruster to be steered more effectively by means of non-uniform distribution of the flow rates of gas injected into each of the compartments.

In a second aspect, the annular channel has a downstream segment beside the open end with a meridian plane that diverges in the downstream direction, in order to limit erosion of the walls, and in particular of the outer wall, by the diverging jets of ionized propulsion gas.

In a third aspect, the annular channel is not axisymmetric. In particular, it may present a cross-section with a main axis of symmetry and a secondary axis of symmetry that is perpendicular to and shorter than the main axis of symmetry. Since the lateral component of the thrust associated with each compartment is substantially perpendicular to the perimeter of the annular channel, such a non-axisymmetric configuration, which favors propulsion gas flow rate, and thus thrust, in some lateral directions over others, is particularly suitable for applications such as controlling the trajectory of a geostationary satellite, in which the ability of the thruster to steer its thrust in one particular lateral direction needs to be given precedence compared with other lateral directions. Nevertheless, in alternative embodiments, it is also possible to envisage using axisymmetric shapes.

In a fourth aspect, the at least one individual flow rate regulator device is connected to a control unit, thus enabling it to be controlled, a plurality of such devices to be controlled together, and even a plurality of Hall effect thrusters to be controlled together, providing they are all connected to the same control unit.

In a fifth aspect, the concentric walls are made of ceramic material, which is particularly appropriate because of its electrical and magnetic characteristics and its ability to withstand erosion.

The invention also provides a space vehicle incorporating such a steerable-thrust Hall effect thruster for controlling the attitude and/or the trajectory of the space vehicle, and it also relates to a method of generating steerable thrust by means of a Hall effect thruster.

At least one implementation of this method comprises the steps of: emitting electrons from a cathode situated outside an open end of an annular channel defined by two concentric walls with a central axis; generating a magnetic field by means of a magnetic circuit at the open end of the annular channel in order to trap the electrons emitted by the cathode, thereby generating an electric field between the open end and an anode situated at a closed end of the annular channel; injecting a propulsion gas via an injection circuit into an upstream segment of the annular channel that is subdivided into a plurality of separate compartments by radial walls, each compartment receiving a flow of gas that is individually regulated by a regulator device; ionizing the propulsion gas by means of electrons escaping from the magnetic field towards the anode; accelerating the ionized propulsion gas by means of the electric field in the axial direction towards the open end of the annular channel; and finally deflecting the propulsion gas radially outwards by means of a virtual cathode grid that is inclined relative to a transverse plane of the thruster and that is formed by electrons trapped by a final stage of the magnetic circuit comprising an inner pole and a facing outer pole with the inner pole being axially offset downstream relative to the outer pole.

In this method, the individual valves may be controlled by a control unit, and the modulus and/or the direction of the thrust may be controlled in order to control the trajectory and/or the attitude of a space vehicle incorporating the Hall effect thruster.

BRIEF DERSRIPTION OF THE SEVERAL VIEWS OF THE DRAWING

The invention can be well understood and its advantages appear better on reading the following detailed description of an embodiment given by way of non-limiting example. The description refers to the accompanying drawings, in which.

Figure 1:
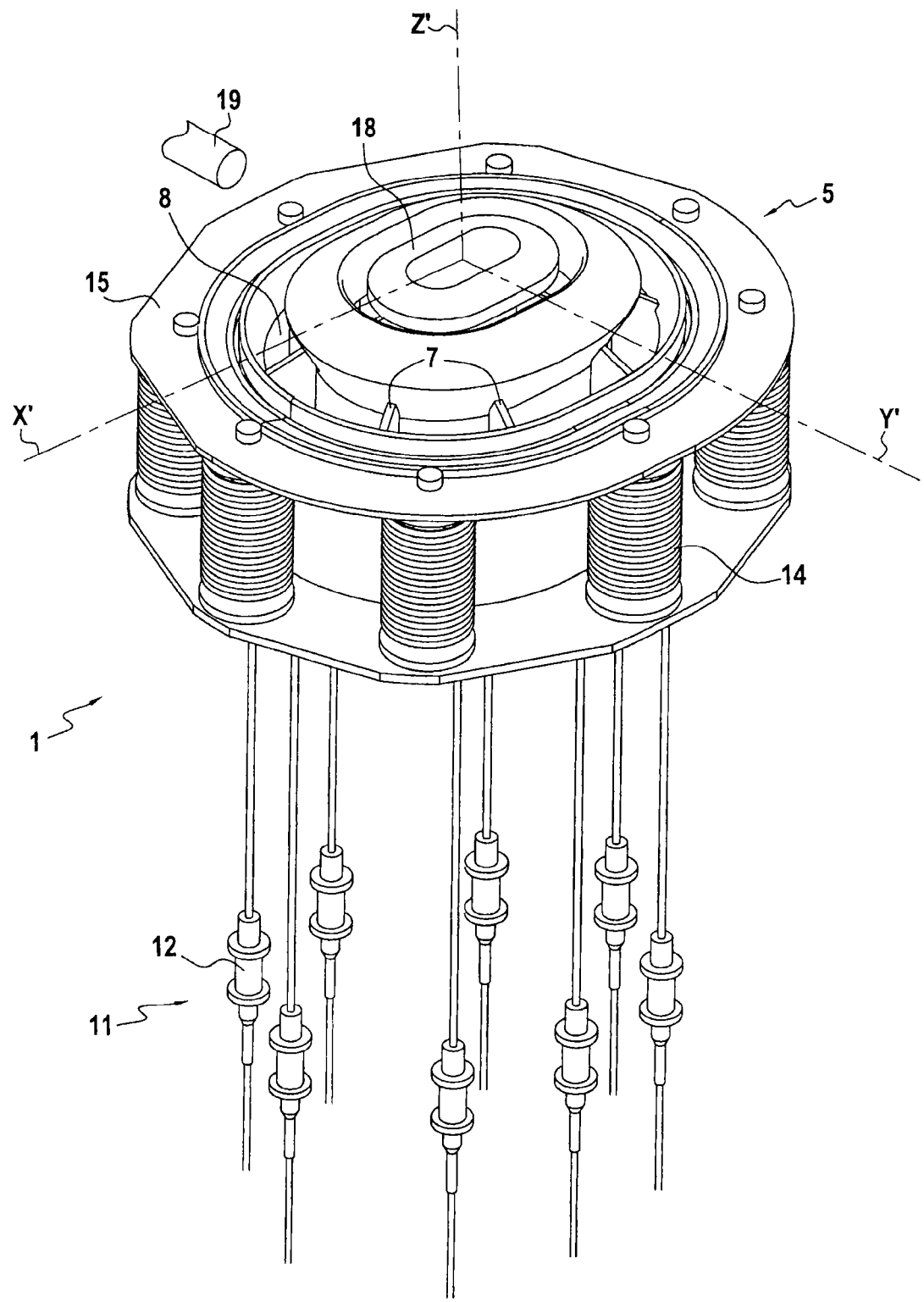
FIG. 1 is a perspective view of a steerable-thrust Hall effect thruster in this embodiment.
Figure 3:
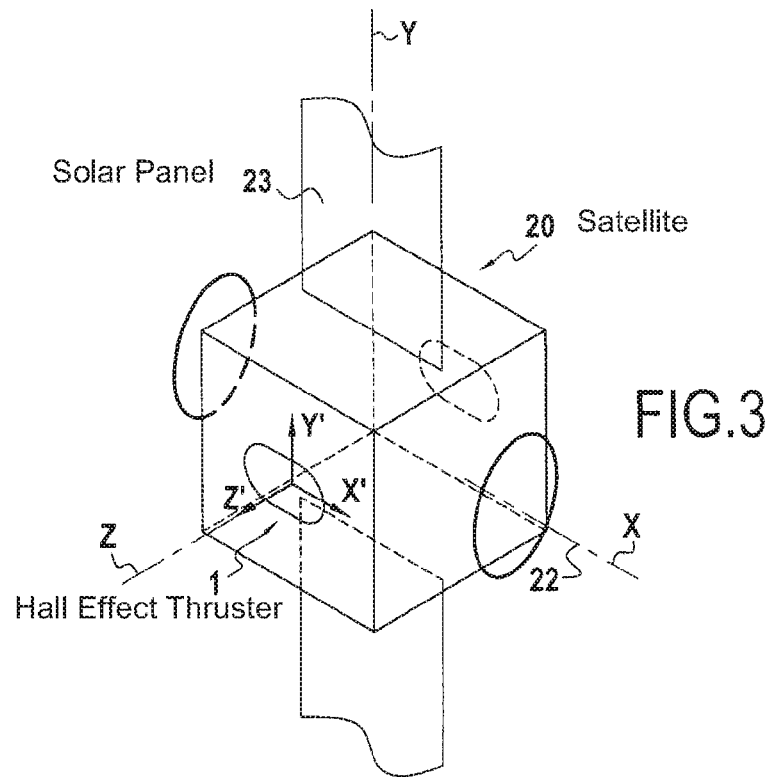
Figure 2A:
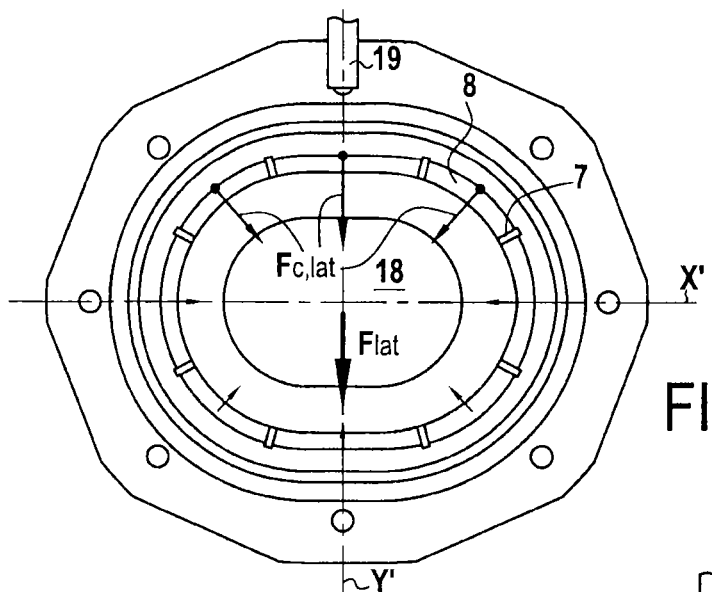
Figure 2B:
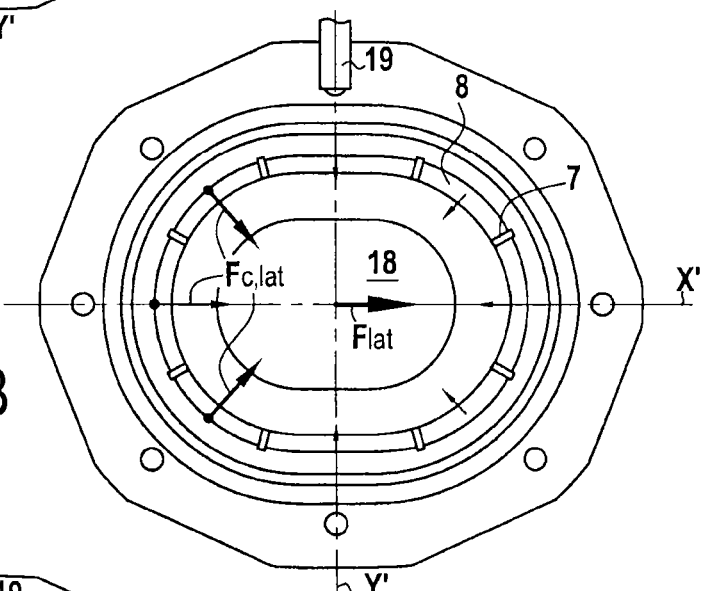
Figure 2C:
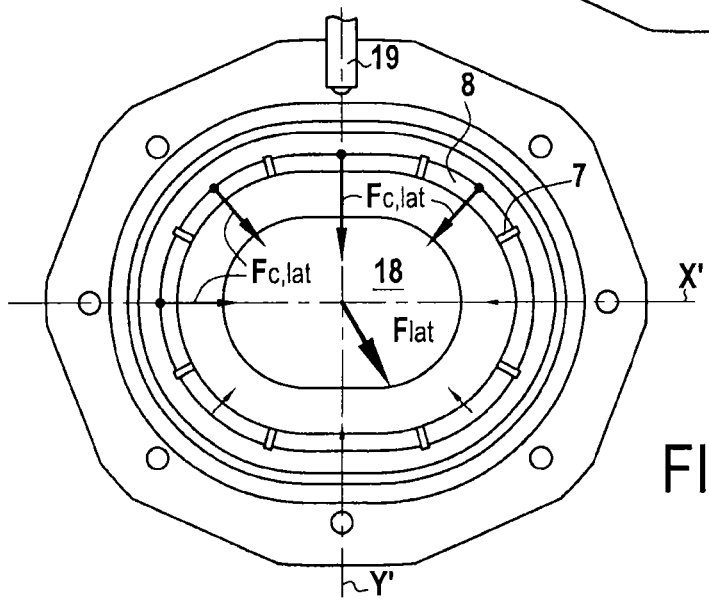

FIGS. 2A, 2B, and 2C are diagrammatic plan views showing the FIG. 1 thruster generating lateral thrust; and FIG. 3 is a diagrammatic perspective view of a geostationary satellite fitted with a steerable-thrust Hall effect thruster of FIG. 1 for controlling its attitude and orbit.

DETAILED DESCRIPTION OF THE INVENTION

Figure 1A:
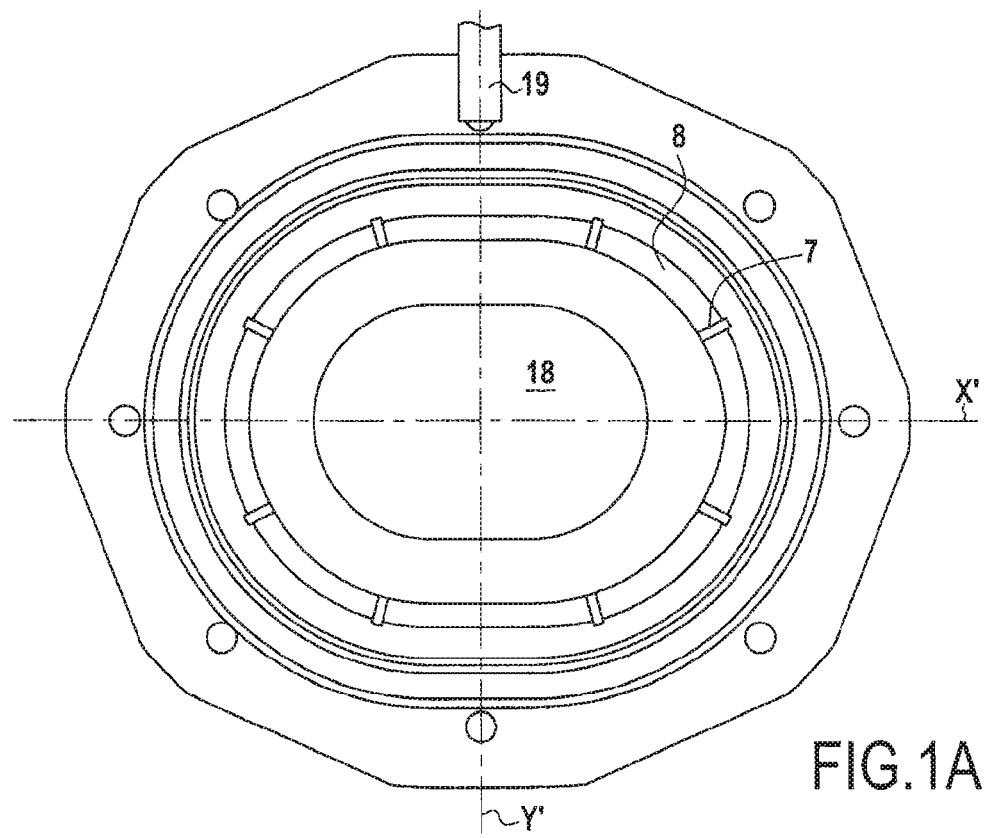
FIG. 1A is a plan view of the steerable-thrust Hall effect thruster of FIG. 1.
Figure 1B:
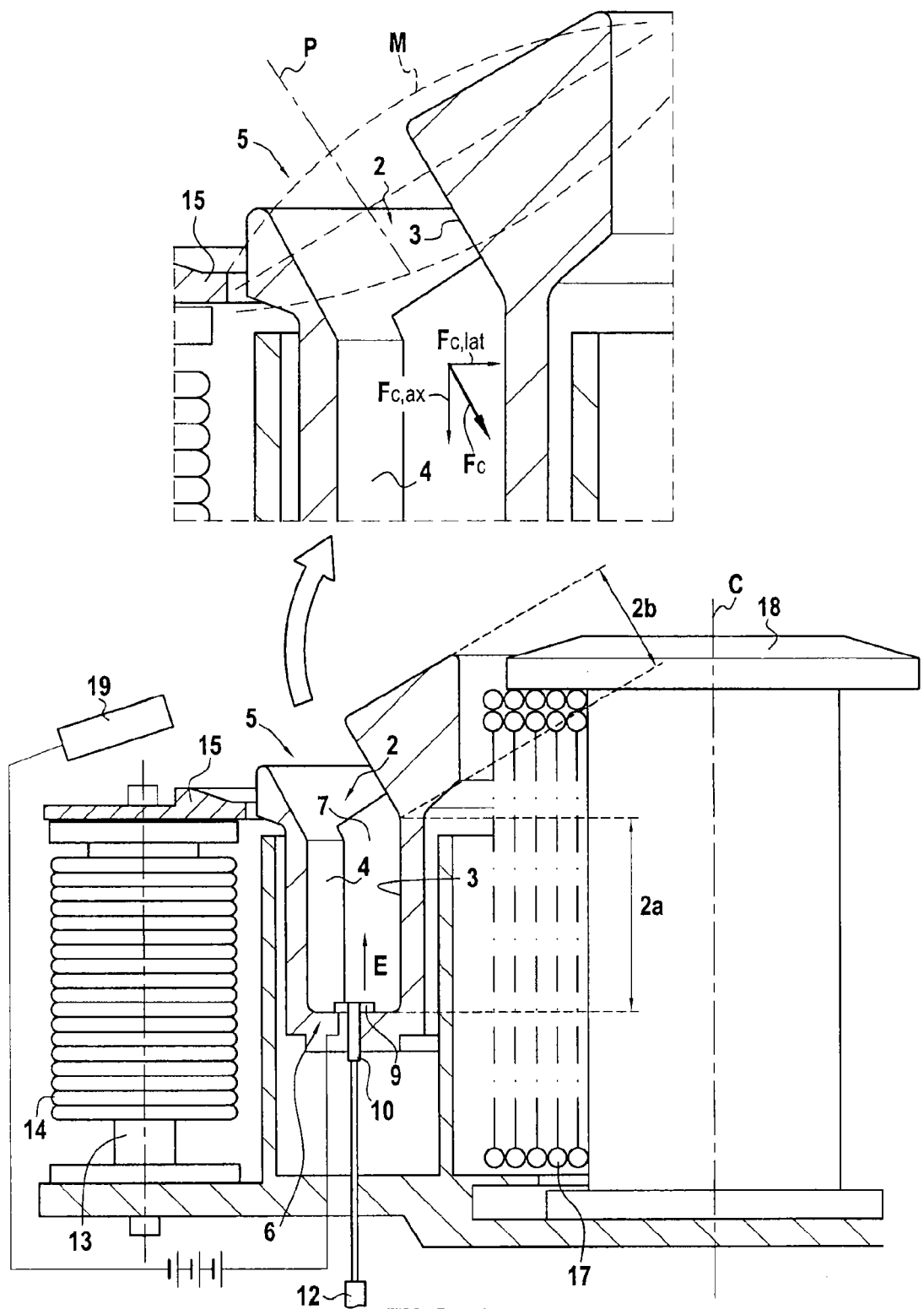
FIG. 1B is a longitudinal section of the steerable-thrust Hall effect thruster on line IB-IB of FIG. 1A.

FIGS. 1, 1A, and 1B are various views of the same Hall effect thruster 1 in an embodiment. The thruster 1 has an annular channel 2 defined by two concentric walls 3 and 4 about a central axis Z', which walls are made of ceramic material. The annular channel 2 has an open end 5 and a closed end 6. Beside the closed end 6, radial walls 7 subdivide an upstream segment 2a of the annular channel 2 into separate compartments 8. At its closed end 6, the annular channel 2 also has an anode 9, which may be segmented among the various compartments 8, and a nozzle 10 for injecting propulsion gas into each compartment 8. The nozzles 10 are connected to a source of propulsion gas by an injection circuit 11 including an individual flow rate regulator device 12 for each nozzle 10. By way of example, each device 12 may be a pencil valve or a thermo-capillary, i.e. a capillary with heater means enabling its temperature to be varied actively and thus enabling the flow rate passing through it to be varied actively. Such devices 12 may also be associated with passive restrictors. The propulsion gas may be xenon, which presents the advantages of high molecular weight and comparatively low ionization potential. Nevertheless, as in other Hall effect thrusters, a wide variety of propulsion gases could be used.

Beside its open end 5, the annular channel 2 has a downstream segment 2b that is inclined laterally outwards. Thus, in this downstream segment 2b, both the inner wall 3 and the outer wall 4 are inclined outwards, defining between them a meridian plane P that is likewise inclined outwards and thus diverges in the downstream direction.

The thruster 1 also has a magnetic circuit. Around the outer wall 4, the magnetic circuit comprises magnetic cores 13 surrounded by coils 14 and terminating in an outer pole 15 close to the open end 5 of the annular channel 2. The magnetic circuit also has a central magnetic core 16 at the center of the thruster 1, which core is surrounded by coils 17 and terminates in an inner pole 18 of polarity opposite to the outer pole 15 and situated facing it in the proximity of the open end 5 of the annular channel 2, so as to generate a radial magnetic field M between them. Relative to the central axis Z', the inner pole 18 is situated downstream from the outer pole 15 so that the magnetic field M is inclined relative to a transverse plane, and is substantially perpendicular to the meridian plane P. Finally, the thruster 1 also has a hollow cathode 19 situated downstream from the open end 5 of the annular channel 2.

The annular channel 2 is not axisymmetric. In particular, in the embodiment shown, its cross-section is in the shape of a running track, with a main axis of symmetry X' and a shorter secondary axis of symmetry Y'. Thus, this cross-section presents two straight segments and two semicircular segments interconnecting the straight segments. The meridian plane P is thus flat in the straight segments, and conical in the semicircular segments. Nevertheless, other shapes could be envisaged as alternatives, both shapes that are not axisymmetric (e.g. of oval cross-section), and shapes that are axisymmetric.

In operation, a voltage, typically lying in the range 150 V to 800 V, is established between the hollow cathode 19 downstream from the open end 5 of the annular channel 2 and the anode 9 at the closed end of the annular channel 2. The hollow cathode 19 thus begins to emit electrons, which are trapped for the most part in a magnetic enclosure formed by the magnetic field M, which is typically of the order of 100 gauss to 300 gauss. The electrons tapped in this magnetic enclosure thus form a virtual cathode grid. An electric field E is thus generated in the annular channel between the anode 9 and this virtual cathode grid.

Highly energetic electrons (typically having energy in the range 10 electron volts (eV) to 40 eV) escape from the magnetic enclosure towards the anode 9, while the propulsion gas is injected into the compartments 8 via the nozzles 10. Impacts between these electrons and the propulsion gas atoms serve to ionize the propulsion gas, which is then accelerated by the electric field E towards the open end 5 of the annular channel 2. Since the mass of a propulsion gas ion is several orders of magnitude greater than the mass of an electron, the magnetic field M does not confine these ions in the same way. Nevertheless, the inclination of the magnetic field M, and thus of the virtual cathode grid formed by the electrons that are trapped by this magnetic field M, gives rise to a lateral component in the electric field E, significantly deflecting in an outward direction the ionized propulsion gas that passes through the downstream segment 2b and the open end 5 of the annular channel 2. The propulsion gas injected into each compartment 8 thus generates a partial thrust $F_c$ having both an axial component $F_{c,ax}$ parallel to the central axis Z', and a lateral component $F_{c,lat}$ in a direction that is specific to each of the compartments and perpendicular to the outline of the annular channel 2.

The overall thrust F from the thruster 1 is the sum of the partial thrusts $F_c$ corresponding to all of the compartments 8 that are fed with propulsion gas. If the partial thrusts $F_c$ are symmetrical, their lateral components $F_{c,lat}$ cancel mutually and the total thrust is directed substantially along the central axis C. Nevertheless, if a compartment 8 is fed with propulsion gas at a flow rate greater than the opposite compartment 8, then the partial thrust $F_c$ corresponding to the compartment 8 that is fed with the greater flow rate will predominate over that corresponding to the opposite compartment 8. The total thrust F will thus have a lateral component $F_{lat}$.

Turning to FIGS. 2A to 2C, it can be seen more clearly how the distribution of the total flow rate of propulsion gas among the various compartments 8 affects the direction and the modulus of the lateral component $F_{lat}$ of the total thrust F from the thruster 1. Thus, one situation is shown in FIG. 2A, in which the compartments 8 situated on one side of the main axis of symmetry X' are fed at flow rates that are greater than those fed to the compartments situated on the opposite side. Consequently, their partial thrusts $F_c$ are likewise greater, and the total thrust F from the thruster 1 presents a lateral component $F_{lat}$ extending perpendicularly to said main axis of symmetry X'. FIG. 2B shows another situation in which the compartments 8 situated on one side of the secondary axis of symmetry Y' are fed with flow rates greater than those fed to the compartments situated on the opposite side. Thus, in this second situation, the total thrust F from the thruster 1 presents a lateral component $F_{lat}$ extending perpendicularly to the secondary axis of symmetry Y'. Nevertheless, because of the non-axisymmetric shape of the thruster 1, the lateral component $F_{lat}$ in this direction is smaller than in the above-described situation. Finally, it is possible to control the propulsion gas feed to the various compartments 8 in order to steer the lateral component $F_{lat}$ of the thrust over 360° around the central axis Z'. Thus, FIG. 2C shows a third situation in which three quadrants of the thruster 1 are fed with propulsion gas so as to generate propulsion with a lateral component $F_{lat}$ that slopes relative to both axes of symmetry X' and Y'.

FIG. 3 shows a satellite 20 having two steerable-thrust Hall effect thrusters 1 for controlling its attitude and trajectory. The satellite 20 shown is a geostationary satellite with its attitude being maintained about three axes, and thus following an orbit 22 that its substantially equatorial while pointing in substantially fixed manner relative to an azimuth axis Z, and a north-south axis Y. For this purpose, a first thruster 1 is fastened to the nadir face 20a of the satellite, and a second thruster 1 is fastened to the anti-nadir face 20b of the satellite. The two thrusters 1 are connected to at least one propulsion gas tank (not shown) and to at least one source of electricity (not shown) to feed them respectively with propulsion gas and electricity. The two thrusters 1 are also connected to a control unit (not shown), which is connected to attitude and/or position sensors (not shown), such as for example star sensors, sun sensors, earth or horizon sensors, inertial sensors, magnetometers, gravimeters, etc. Thus, the control unit can determine the trajectory and the attitude of the satellite 20 and can control the thrusters 1 to modify or correct the trajectory and/or the attitude of the satellite 20 in application of instructions that have previously been recorded or that are transmitted to the satellite 20 from a base station. Typically, the solar panels 23 of such a geostationary satellite are mounted on arms pointing along the north-south axis Y in order to track the sun better during the orbit of the satellite 20 by rotating the panels 23 about the north-south axis Y.

In the satellite 20 that is shown, the central axis Z' of each thruster 1 is in alignment with the azimuth axis Z, the main axis of symmetry X' is parallel to the east-west axis X, and the secondary axis of symmetry Y' is parallel to the north-south axis Y. Thus, the main thrust direction of the two thrusters 1 is in alignment with the azimuth axis Z in order to maintain orbit. At the same time, the two thrusters 1 can deliver large lateral thrust in the north-south direction, and smaller lateral thrust in the east-west direction. The lateral thrust from the thrusters 1 in the north-south direction serves to control the angle of inclination of the orbit 22, and also to deliver steering torque to the satellite 20 about its east-west axis X. The lateral thrust from the thrusters 1 in the east-west direction serves mainly to steer the satellite 20 about its north-south axis Y. It is important to observe that because of the position of the solar panels 23, the moment of inertia on the satellite 20 about the east-west axis X is typically greater than its moment of inertia about the north-south axis Y. The non-axisymmetric shape of the thrusters 1 is thus well adapted to steering the satellite 20 about the axes X and Y.

Although the invention is described above with reference to specific embodiments, it is clear that various modifications and changes may be undertaken on those embodiments without going beyond the general scope of the invention as defined by the claims. In particular, the individual characteristics of the various embodiments shown may be combined to form additional embodiments. Consequently, the description and the drawings should be considered as being illustrative rather than restrictive.

The invention claimed is:

1. A steerable-thrust Hall effect thruster comprising:
    an annular channel defined by two concentric walls with a central axis, the annular channel including an open end and a closed end, and including an upstream segment beside the closed end that is subdivided by radial walls into a plurality of separate compartments;
    an anode situated at the closed end of the annular channel;
    an injection circuit for injecting propulsion gas into the separate compartments of the annular channel, the injection circuit including at least one individual flow rate regulator device for each separate compartment;
    a magnetic circuit for generating a magnetic field at the open end of the annular channel and including at least a final stage with an inner pole and a facing outer pole, wherein the inner pole is offset axially downstream relative to the outer pole, so that the magnetic field is inclined relative to a transverse plane of the thruster; and
    a cathode downstream from the open end of the annular channel.

2. The steerable-thrust Hall effect thruster according to claim 1, wherein the annular channel includes a downstream segment beside the open end with a meridian plane that diverges in a downstream direction.

3. The steerable-thrust Hall effect thruster according to claim 1, wherein the annular channel is not axisymmetric.

4. The steerable-thrust Hall effect thruster according to claim 3, wherein the annular channel presents a cross-section with a main axis of symmetry and a secondary axis of symmetry that is perpendicular to and shorter than the main axis of symmetry.

5. The steerable-thrust Hall effect thruster according to claim 1, wherein the at least one individual flow rate regulator device is connected to a control unit.

6. The steerable-thrust Hall effect thruster according to claim 1, wherein the concentric walls are made of ceramic material.

7. The steerable-thrust Hall effect thruster according to claim 2, wherein the magnetic field is substantially perpendicular to the meridian plane.

8. The steerable-thrust Hall effect thruster according to claim 2, wherein the concentric walls of the annular channel in the downstream segment are inclined outwards, and the meridian plane is defined therebetween.

9. A space vehicle incorporating at least one steerable-thrust Hall effect thruster for controlling attitude and/or trajectory of the space vehicle, wherein the at least one steerable-thrust Hall effect thruster comprises:
    an annular channel defined by two concentric walls with a central axis, the annular channel including an open end and a closed end, and including an upstream segment beside the closed end that is subdivided by radial walls into a plurality of separate compartments;
    an anode situated at the closed end of the annular channel;
    an injection circuit for injecting propulsion gas into the separate compartments of the annular channel, the injection circuit including at least one individual flow rate regulator device for each separate compartment;
    a magnetic circuit for generating a magnetic field at the open end of the annular channel and including at least a final stage with an inner pole and a facing outer pole, wherein the inner pole is offset axially downstream relative to the outer pole, so that the magnetic field is inclined relative to a transverse plane of the thruster; and
    a cathode downstream from the open end of the annular channel.

10. A method of generating steerable thrust by a Hall effect thruster, the method comprising:
    emitting electrons from a cathode situated downstream from an open end of an annular channel defined by two concentric walls with a central axis;
    generating a radial magnetic field by a magnetic circuit at the open end of the annular channel to trap the electrons emitted by the cathode, thereby generating an electric field between the open end and an anode situated at a closed end of the annular channel;
    injecting a propulsion gas via an injection circuit into an upstream segment of the annular channel that is subdivided into a plurality of separate compartments by radial walls, each separate compartment receiving a flow of gas that is individually regulated by at least one regulator device;
    ionizing the propulsion gas by electrons escaping from the magnetic field towards the anode; accelerating the ionized propulsion gas by the electric field axially towards the open end of the annular channel; and
    deflecting the propulsion gas, which has been ionized by the ionizing, radially outwards by a virtual cathode grid that is inclined relative to a transverse plane of the thruster and that is formed by electrons trapped by a final stage of the magnetic circuit including an inner pole and a facing outer pole with the inner pole being axially offset downstream relative to the outer pole.

11. The method of generating steerable thrust according to claim 10, wherein at least one regulator device is controlled by a control unit.

12. The method of generating steerable thrust according to claim 10, wherein modulus and/or orientation of the thrust are controlled to control trajectory and/or attitude of a space vehicle incorporating the Hall effect thruster.

* * * * *